United States Patent [19]

Dias et al.

[11] Patent Number: 4,619,805

[45] Date of Patent: * Oct. 28, 1986

[54] METHOD OF PRODUCING POROUS CARBON BODIES OF HIGH PERMEABILITY

[75] Inventors: Francisco J. Dias, Jülich; Marian Kampel, Heinsberg-Oberbruch; Hartmut Luhleich, Düren, all of Fed. Rep. of Germany

[73] Assignee: Kernforschungsanlage Jülich Gesellschaft mit beschränkter Haftung, Jülich, Fed. Rep. of Germany

[ * ] Notice: The portion of the term of this patent subsequent to Jul. 30, 2002 has been disclaimed.

[21] Appl. No.: 741,016

[22] Filed: Jun. 3, 1985

Related U.S. Application Data

[63] Continuation of Ser. No. 579,656, Feb. 13, 1984, abandoned.

[30] Foreign Application Priority Data

Feb. 18, 1983 [DE] Fed. Rep. of Germany ....... 3305530

[51] Int. Cl.$^4$ ............................................. C01B 31/36
[52] U.S. Cl. .................. 264/29.5; 264/29.6; 264/60; 264/63; 264/65
[58] Field of Search ............ 264/63, 29.5, 29.6, 264/29.1, 60, 65

[56] References Cited

U.S. PATENT DOCUMENTS

| | | | |
|---|---|---|---|
| 3,927,187 | 12/1975 | Luhleich et al. | 264/29.1 X |
| 4,003,976 | 1/1977 | Komatsu et al. | 423/213.5 |
| 4,009,143 | 2/1977 | Luhleich et al. | 428/524 |
| 4,059,682 | 11/1977 | Luhleich et al. | 264/29.1 X |
| 4,060,592 | 11/1977 | Luhleich et al. | 264/29.1 |
| 4,064,331 | 12/1977 | Patton | 264/29.5 |
| 4,086,380 | 4/1978 | Juel | 264/29.5 |
| 4,166,145 | 8/1979 | Hatch | 264/29.5 |
| 4,188,279 | 2/1980 | Yan | 264/29.5 |
| 4,234,650 | 11/1980 | Schieber | 264/29.5 |
| 4,409,048 | 10/1983 | Hatch | 264/29.5 |
| 4,532,091 | 7/1985 | Dias et al. | 264/29.5 |

FOREIGN PATENT DOCUMENTS 1365123 8/1974 United Kingdom .

*Primary Examiner*—Donald Czaja
*Assistant Examiner*—Mary Lynn Fertig
*Attorney, Agent, or Firm*—Frishauf, Holtz, Goodman & Woodward

[57] ABSTRACT

In order to provide enough permeability (air or liquid throughput) in a porous molded body of carbon made from a mixture of carbon powder and a binder, a first "green" body (a body of the kind that has been fired heretofore, in its green state before firing) is broken up into small pieces with the help of a jaw crusher in a manner providing coarse particles and a fraction of uniform size (largest particle diameter not more than twice the smallest) in the overall range between 0.2 and 10 mm effective diameter is used to make a second green body of molded shape by placing it in a die and applying a pressure which may be light or heavier according to the desired degree of permeability. The second green body is then coked in vacuum or in an inert atmosphere at a temperature in the range between 600° to 1000° C. to produce a strong body through which gas and liquid may pass with a facility far exceeding what has been accomplished before with a body of comparable strength.

11 Claims, No Drawings

METHOD OF PRODUCING POROUS CARBON BODIES OF HIGH PERMEABILITY

This application is a continuation of application Ser. No. 579,656, filed Feb. 13, 1984, now abandoned.

This invention concerns the method for producing porous bodies of carbon of sufficiently high permeability (throughput) for use in filters for flowing gas or liquids, including use for filtering hot gas flows.

Methods of making porous molded bodies of carbon are disclosed in U.S. Pat. Nos. 3,927,187; 4,059,682, and 4,060,592. Such molded bodies are distinguished by being resistant to high temperature and to temperature changes. Furthermore, the low density of these carbon bodies compared to that of metals is of significance.

The known molded bodies just mentioned also possess a through-going porosity which permit a fluid medium (gaseous or liquid) to pass through the molded bodies. The molded bodies produced by the above-mentioned known methods, however, are not suitable for uses where useful quantities of a fluid must pass through, for example, hot gas filters, flow-through electrodes, catalyst carriers, and the like. In the applications just mentioned, the quantity of gas or liquid flowing through the material must be large, but such a large throughput is not obtainable with the known molded bodies, because the pores are of orders of magnitude only up to about 100 microns (0.1 mm).

SUMMARY OF THE INVENTION

It is an object of the present invention to provide a process that makes it possible to produce molded bodies of carbon which permit the flowing through of sufficiently large quantities of gas or liquid to enable the bodies to be installed as hot gas filters, pass-through electrodes, catalyst carriers and the like. Briefly, a composite powder formed of carbon powder and a cokable organic binder is molded into a "green" precursor body (meaning a body in a state prior to and suitable for firing in a kiln or other furnace). In this case, the precursor body is not itself fired, but instead the body, while still in the green state, is crumbled into granules that are, so far as possible, coarse. From the granular material thus obtained, a grain size fraction is sifted out having a grain size in the range between 0.2 and 10 mm, the particular grain size depending upon the desired degree of permeability to be provided in the porous body. What is sifted out for use, instead of having grain sizes running all the way between the limits just mentioned, is a fraction of relatively uniform grain size, as is obtainable by using standard sieve mesh sizes, which typically involves providing a fraction in which the maximum grain size does not exceed twice the minimum grain size, the grain size range being preferably a little less than that, and the average or median grain size is selected so as to sieve the intended permeability of the end product. With the material of the grain size thus selected resulting from the breaking up of the "green" precursor body, a second "green" body is molded, and here care is taken that in the pressing of the molded product the pressure should be relatively little in order to obtain a relatively high permeability, and heavier where a body of relatively lower permeability is desired. The second green body is then coked in vacuum or in an inert gas atmosphere by heating up to a temperature in the range between 600° and 1000° C. in order to produce the actual porous and highly permeable molded body which is the end product.

The mixture of the carbon powder with the cokable binder can be carried out with kneading or mixing machines. It is particularly advantageous, however, when the preparation of the composite powder is performed according to the method known from U.S. Pat. No. 4,009,143; U.S. Pat. No. 4,003,979, and German Pat. No. 20 40 252. In that case the result is obtained that already the precursor body has a comparatively high porosity and relatively great strength.

Thus, it is desirable, in the production of the composite powder for making the green precursor body, to suspend the carbon particles, which may be of ground coke, artificial graphite, natural graphite, wood charcoal or other vegetable charcoal, or carbon black, or of any two or more of the foregoing, in a first liquid in which, after the suspension is made, a binder consisting of pitch, tar, synthetic resin or the like, is either wholly or partly dissolved. The first liquid and its dissolved and suspended substances is then introduced into a second liquid which is miscible with the first, but in which the binder is either insoluble or soluble only with difficulty. The second liquid will usually be water in the case of phenolic resin and pitch binders. What then happens is that the suspended carbon particles are coated with the binder and settle and form a muddy mass, which is then freed of supernatant liquid and thereafter dried.

The production of the green precursor body from the dried composite powder is performed by known processes such as die-pressing, extrusion, drossing or similar methods. Here again, however, it is advantageous to proceed according to the process known from U.S. Pat. Nos. 3,927,187; 4,059,682, and 4,060,592, by which after drying out the second liquid from the mud, the powder thus obtained is put into the mold provided for shaping the body, and finally, it is exposed to the vapor of the liquid or liquids in which the binder was partially or wholly soluble. The binder in the uncoked powder preferably constitutes more than 25% by weight thereof and not more than 60%.

Likewise, for producing the second green body, it is advantageous to make corresponding use of the method of operation given in U.S. Pat. Nos. 3,927,187; 4,059,682, and 4,060,592. In this case, the granule fraction provided as starting material for the second green body is put into the mold provided for shaping the article, after which it is exposed to the vapor of liquids in which the binder is entirely or partly soluble. Then it is dried.

The crumbling of the green precursor body into granules is preferably performed in a jaw crusher that is set in such a way that a principal granule size fraction corresponding to the desired permeability of the final product will be produced. The greater the gas or liquid throughput of the final product should be, the greater the grain size of the broken-up material should be. The grain size is selected by corresponding selection of the sieve mesh sizes respectively used for elimination of grains too large in one case and too small in the other. From such a powder having a relatively uniform grain size, a green body is produced anew, preferably by means of die-pressing, because by that method the pressure used in the die-pressing molding process can be made the smaller, the greater the permeability of the end product is intended to be.

At this process stage, the use of the processes known from German Pat. No. 20 40 252 and from U.S. Pat.

Nos. 4,009,143 and 4,023,979 is also favorable for good results in the practice of the present invention, because the pressures necessary for molding the second green body can be very low because of the uniform coating of the powder grains with a skin of binder in the making of the first green body. Even though the pressing in the molding of the second green body may be very light in order to obtain high porosity, the use of these methods of preparing the mixed powder for the first green body assure that the second green body will have comparatively high strength.

The molded green body produced after the crushing of the precursor body from the selected grain size fraction thereof is made of a granulate of coarse grains and accordingly has the relatively large pores that the coked end product will have.

For the case in which the porous permeable molded body would be heated in its intended use to temperatures higher than the coking temperature, an additional heat treatment is made to follow the coking. In that additional heat treatment, the molded body is heated in vacuum or in an inert gas atmosphere to a temperature that is at least equal to the highest temperature of intended use. In fact, it is desirable to run this heat treatment to a temperature that lies somewhat above the latter temperature.

EXAMPLE 1

900 g of an artificial graphite powder sometimes called electrographite (principal grain size 60 $\mu$m-80 $\mu$m), of which the particles were uniformly encased with a binder of phenolformaldehyde resin in accordance with a process known from German Pat. No. 20 40 252, the binder content being 30% by weight of the powder, were filled into a molding die and the corresponding punch was set on top. The die and covering punch were then put into a drying compartment when preheated to 110° C. and left there for two hours. The warmed powder mass was then pressed with a pressure of 1 bar to produce a green precursor body, which was removed from the die after cooling. The molded body measured 98 mm×98 mm×94 mm and had a geometric density of 1.00 g/cm$^2$.

The green precursor body was then coarsely broken up and the fragments were then further reduced in size with a jaw crusher. Different fractions were separated by sieves from the resulting particle mixture.

40 g of granulate having a grain size running from 1.4 mm to 2 mm were uniformly filled into a die having a floor surface of 70 mm×80 mm and were loaded with the corresponding punch which had a mass such that a pressure of 50 mbar was exerted on the mass of granulate. The die prepared in this manner was then placed in a drying compartment preheated to 140° C. and allowed to heat up. The die was then removed from the drying compartment and cooled, after which the contents were removed. The green body thus obtained in the shape of a plate of granulate was then coked in an argon atmosphere by heating to 800° C. The molded body thus produced then had dimensions of 76 mm×66 mm×9.5 mm and an air permeability of 1.20 l/cm$^2$ per minute at a pressure difference of 20 mm WC (water column).

EXAMPLE 2

A granulate sieve fraction produced in accordance with Example 1 running from a minimum grain size of 1.4 mm up to a maximum grain size of 2 mm was filled into a die and warmed up in the same manner as in the case of Example 1, but in this case it was put under the weight of a mating punch of greater mass, so that the pressing force was 100 mbar. After cooling and removing from the form, there was obtained as a "green" body a plate that was thinner than the one produced under the conditions of Example 1. After coking, the molded body had the dimensions 76 mm×66 mm×8.5 mm and an air permeability of 0.57 l/cm$^2$ per minute at a pressure difference of 20 mm WC.

EXAMPLE 3

A sieve fraction running from 0.9 mm to 1.4 mm of a granulate produced in accordance with Example 1 was pressed with a pressure of 100 mbar in a manner corresponding to that set forth in Example 2, and the green body thus produced was then coked. The molded body thus produced had the dimensions 76 mm×66 mm×9 mm and an air permeability of 0.22 l/cm$^2$ per minute at a pressure difference of 20 mm WC.

EXAMPLE 4

Electrographite powder corresponding to Example 1, the powder grains of which were coated with phenolformaldehyde resin binder was filled into a die. The latter had holes of 4 mm diameter and was equipped with a lining of two layers of filter paper before filling with the powder. After uniform filling of the powder in layers, the powder was covered with filter paper and a similarly perforated mating punch was rested on the powder, the mass of the punch being so selected that it exerted a pressure of 100 mbar. The mold thus prepared was put into a vacuum drying compartment preheated to 70° C. and evacuated to a pressure of about 0.5 mbar. Then methanol vapor was introduced into the drying compartment until the pressure reached 600 mbar. After half an hour under those conditions, the drying compartment was evacuated again and then ventilated with air. After cooling, the green precursor body was removed from the die and then a molded carbon body, through which gas and liquid could pass, was made in the same manner as in the case of Example 1. The air permeability in this case was 0.8 liters per square centimeter per minute at a pressure difference of 20 mm WC.

EXAMPLE 5

980 g of an electrographite powder (principal grain size 60 $\mu$m to 80 $\mu$m) was uniformly mixed with a solution of 420 g of a phenolformaldehyde resin in enough alcohol solvent to provide a 30% by weight alcoholic solution of the rest. The resulting mass was then dried in a drying compartment by evaporating off the alcohol, after which the residue was ground up. The powder thus obtained was filled into a die, heated up to 110° C. in a drying compartment and then pressed with a pressure of 8 bar. After cooling, the contents of the die was removed therefrom. The molded body had the measurement 98 mm×98 mm by 121 mm and a geometric density of 1.2.

Using the precursor body made as just described, a second green body was made in the manner described in Example 1, which was then coked to produce a molded body through which gas or liquid could pass. The air permeability of this molded body, at 20 mm WC differential pressure, was found to be 0.7 liters per square centimeter per minute.

Although the invention has been described with reference to particular illustrative examples, it should be understood that modifications and variations are possible within the inventive concept.

We claim:

1. Method of producing permeable porous molded bodies of carbon which are capable of high fluid throughput, comprising the steps of:
    preparing a composite molding powder from carbon powder and a cokable organic binder;
    molding a cohesive precursor body in the green state from said molding powder;
    crushing said precursor body in the green state in a manner selected for obtaining a granulate predominantly of a desired size within the range of particle size from 0.2 to 10 mm;
    selecting from said granulate a fraction having a maximum particle size not exceeding twice the minimum particle size, said fraction having particle sizes within the range from 0.2 to 10 mm and being selected as to average particle size by reference to the permeability desired for the end product;
    molding a second body in the green state from said selected granulate fraction with pressing at a pressure that is lighter, the greater is said permeability desired for said end product, and
    coking said second green-state body by heating in vacuum or in an inert atmosphere up to a temperature in the range between 600° and 1000° C., thereby producing said end product having high-throughput permeability.

2. Method according to claim 1, in which the step of preparing said composite molding powder comprises the substeps of:
    suspending in a liquid a carbon powder composed of at least one material selected from the group consisting of ground coke, artificial graphite, natural graphite, vegetable charcoal and carbon black;
    at least partially dissolving in said suspension a binder selected from the group consisting of pitch tar and synthetic resin;
    pouring the suspension-solution into a second liquid with which said first liquid is miscible, but in which said binder is either insoluble or soluble only with difficulty and thereby causing the binder to precipitate on the suspended particles and thereby coat the same;
    settling said suspended coated particles;
    freeing said coated particles from liquid by decantation and then drying said coated particles.

3. Method according to claim 2, in which said binder is a phenolic resin or pitch and the second liquid is water.

4. Method according to claim 2, in which the pouring of said suspension into said second liquid is performed in a mixing chamber by means of a mixing nozzle through which said suspension is sprayed into said second liquid in such a way that the carbon particles are uniformly coated with said binder.

5. Method according to claim 2, in which the step of molding said precursor body comprises the substeps of:
    placing the dried coated particles into a perforated mold, heating said particles in said mold sufficiently in a drying compartment to vaporize liquids in which said binder is at least partly soluble, and then pressing said particles while warm in said mold with a pressure of at least 1 bar therein.

6. Method according to claim 4, in which the step of molding said precurser body comprises the substeps of:
    placing the dried coated particles in a perforated mold and placing said mold in a vacuum drying compartment, introducing into said compartment the vapor of at least one liquid in which said binder is at least partly soluble to expose said coated particles to said vapor, and then evacuating said compartment and aerating said compartment.

7. Method according to claim 5, in which said binder comprises more than 25% by weight of the dried coated powder.

8. Method according to claim 6, in which said binder comprises more than 25% by weight of the dried coated particles.

9. Method according to claim 1, in which the step of molding said second green-state body comprises the substeps of:
    placing said granulate fraction in a mold and pressing it with at least 0.05 bar of pressure therein; and
    drying by heating, followed by further heating for the performance of the step of coking said second green-state body.

10. Method according to claim 1, in which the step of producing permeable porous molded bodies of carbon, usable in a particular intended use at temperatures higher than the coking temperature, in which method the coking step is followed by a further high-temperature treatment in which the molded body is heated in vacuum or in an inert gas atmosphere up to a temperature that is at least as high as a conventional maximum temperature for said particular intended use.

11. Method according to claim 1, in which the step of molding said precursor body comprises the substeps of:
    placing the dried coated particles into a perforated mold, heating said particles in said mold sufficiently in a drying compartment to vaporize liquids in which said binder is at least partly soluble, and then pressing said particles while warm in said mold with a pressure of at least 8 bars therein.

* * * * *